United States Patent
Jung et al.

(10) Patent No.: US 9,648,375 B2
(45) Date of Patent: May 9, 2017

(54) DISPLAY APPARATUS, REMOTE CONTROLLER AND CONTROL METHOD THEREOF

(71) Applicant: SAMSUNG ELECTRONICS CO., LTD., Suwon-si (KR)

(72) Inventors: Do-sung Jung, Seoul (KR); Nam-hyun Park, Suwon-si (KR); Hae-sung Park, Seoul (KR); Ri-na Shin, Seongnam-si (KR); Hyung-ho Hwangbo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/220,788

(22) Filed: Mar. 20, 2014

(65) Prior Publication Data
US 2014/0289774 A1 Sep. 25, 2014

(30) Foreign Application Priority Data

Mar. 20, 2013 (KR) .................. 10-2013-0029688

(51) Int. Cl.
*H04N 21/422* (2011.01)
*H04N 21/472* (2011.01)
(Continued)

(52) U.S. Cl.
CPC ..... *H04N 21/42208* (2013.01); *H04N 5/4403* (2013.01); *H04N 21/42207* (2013.01);
(Continued)

(58) Field of Classification Search
CPC ............. H04N 5/4403; H04N 5/44543; H04N 21/44222; H04N 5/44582;
(Continued)

(56) References Cited

U.S. PATENT DOCUMENTS 7,584,214 B2 9/2009 Narahara et al.
7,650,319 B2 1/2010 Hoffberg et al.
(Continued)

FOREIGN PATENT DOCUMENTS

EP 1 569 445 A2 8/2005
JP 2012-235528 A 11/2012
(Continued)

OTHER PUBLICATIONS

International Search Report dated May 27, 2014 issued in International Application No. PCT/KR2014/001067.
(Continued)

*Primary Examiner* — Pankaj Kumar
*Assistant Examiner* — Alazar Tilahun
(74) *Attorney, Agent, or Firm* — Sughrue Mion, PLLC (57) ABSTRACT

A display apparatus and a method of controlling the display apparatus are provided. The display apparatus includes: an image processor configured to process an image of a predetermined content; a display configured to display the processed image of the content; a communicator configured to communicate with a remote controller configured to receive a user command and display information related to the content; and a controller configured to control the display to display the image of the content in accordance with the received user command, store information related to a use history that the user has used the content, and transmit information to the remote controller related to the stored use history of the user so that the information related to the content can be displayed on the remote controller based on the use history of the user.

22 Claims, 8 Drawing Sheets

(51) Int. Cl.
  *H04N 21/482* (2011.01)
  *H04N 5/44* (2011.01)
  *H04N 21/442* (2011.01)

(52) U.S. Cl.
  CPC . *H04N 21/42209* (2013.01); *H04N 21/44222* (2013.01); *H04N 21/472* (2013.01); *H04N 21/482* (2013.01)

(58) Field of Classification Search
  CPC ... H04N 2005/4412; H04N 2005/4414; H04N 21/4312; H04N 21/4826; H04N 21/4825; H04N 5/445
  USPC ............................................. 725/46; 348/734
  See application file for complete search history.

(56) References Cited

U.S. PATENT DOCUMENTS

| | | | | |
|---|---|---|---|---|
| 7,966,632 | B1* | 6/2011 | Pan .................... | H04N 5/44543 725/45 |
| 8,042,136 | B2 | 10/2011 | Narahara et al. | |
| 8,225,355 | B2 | 7/2012 | Maruyama et al. | |
| 8,687,128 | B2* | 4/2014 | Stahulak ............ | H04N 5/44543 348/473 |
| 8,743,294 | B2* | 6/2014 | Fan et al. ...................... | 348/734 |
| 2005/0251825 | A1 | 11/2005 | Fukuda et al. | |
| 2006/0123053 | A1 | 6/2006 | Scannell, Jr. | |
| 2007/0061023 | A1 | 3/2007 | Hoffberg et al. | |
| 2007/0146160 | A1 | 6/2007 | Takeshita | |
| 2010/0037260 | A1 | 2/2010 | Fukuda | |
| 2011/0138416 | A1* | 6/2011 | Kang .................... | G06F 3/0482 725/39 |
| 2011/0283220 | A1 | 11/2011 | McIntyre et al. | |
| 2012/0020428 | A1* | 1/2012 | Roth ..................... | G08C 17/02 375/295 |
| 2012/0117600 | A1 | 5/2012 | Friedlander et al. | |
| 2012/0311633 | A1 | 12/2012 | Mandrekar et al. | |
| 2013/0010209 | A1 | 1/2013 | Takiguchi et al. | |

FOREIGN PATENT DOCUMENTS

| | | |
|---|---|---|
| KR | 10-2011-0033625 A | 3/2011 |
| KR | 10-1268133 B1 | 5/2013 |
| WO | 2011/102886 A1 | 8/2011 |

OTHER PUBLICATIONS

Office Action received from the European Patent Office in EP Application No. 14159232.9-1905 dated Apr. 14, 2015.
Communication dated Aug. 24, 2016, issued by the European Patent Office in counterpart European Application No. 14159232.9.

* cited by examiner

DISPLAY APPARATUS, REMOTE CONTROLLER AND CONTROL METHOD THEREOF

CROSS-REFERENCE TO RELATED APPLICATION

This application claims priority from Korean Patent Application No. 10-2013-0029688, filed on Mar. 20, 2013 in the Korean Intellectual Property Office, the disclosure of which is incorporated herein by reference, in its entirety.

BACKGROUND

Technical Field

Apparatuses and methods consistent with the exemplary embodiments relate to a display apparatus, a remote controller and a control method thereof. More particularly, the exemplary embodiments relate to a display apparatus, a remote controller for remotely controlling the display apparatus, and a control method thereof.

Description of the Related Art

A display apparatus such as a television (TV) offers contents received through a broadcast signal, e.g., a TV signal to a user in the form of an image and a sound. Further, the display apparatus may provide a user with information related to the contents so that she/he can select a desired content from among a plurality of contents.

A display apparatus of the related art offers users information related to the content in the form of an electronic program guide (EPG). Thus, a user can use the information related to the content on the EPG through control by a remote controller.

However, the EPG has no choice but to cover a screen, and it is therefore inconvenient for a user to view the content. Also, control by the remote controller is limited to simple operations such as up, down, left and right moves, item selection, etc., and it is thus difficult for a user to freely use the information related to the content. Further, a remote controller using touch or motion input has recently been proposed, but such an extended input method is also insufficient to more effectively use the information related to the various contents.

SUMMARY

One or more exemplary embodiments may provide a display apparatus, a remote controller and a control method thereof, in which information related to contents can be more effectively used with minimum interference with a user's view of the contents.

Another exemplary embodiment may provide a display apparatus, a remote controller and a control method thereof, in which information related to contents can be more conveniently used in accordance with a user's propensity of using contents.

Still another exemplary embodiment may provide a display apparatus, a remote controller and a control method thereof, which allows a user to more intuitively use information related to contents.

According to an aspect of an exemplary embodiment, a display apparatus includes: an image processor configured to process an image of a predetermined content; a display configured to display the processed image of the content; a communicator configured to communicate with a remote controller configured to receive a user command and display information related to the content; and a controller configured to control the display in order to display the image of the content in accordance with the user command, stores information related to a history of use where the user has used the content, and transmits to the remote controller information related to the stored use history so that the information related to the content can be displayed on the remote controller, based on the use history of the user.

The controller may transmit the information related to the use history of the user which corresponds to the content being currently displayed on the display to the remote controller through the communicator.

The information related to the use history of the user may include information related to at least one content relevant to the content currently displayed on the display.

The information related to the use history of the user may include information related to the currently displayed content and information related to a viewing propensity of the user concerned with the at least one relevant content.

The information related to the content may include a graphic user interface (GUI) item of the currently displayed content and a GUI item of the at least one relevant content.

The controller may control the display to display an image related to one relevant content selected in accordance with the user command from among the GUI items of the relevant contents.

According to another aspect of an exemplary embodiment, a method of controlling a display apparatus includes: receiving a command of a user from a remote controller capable of displaying information related to content; displaying an image of the content in accordance with the received command of the user; storing information related to a use history that the user has used the content; and transmitting information related to the stored use history to the remote controller so that the information related to the content can be displayed on the remote controller based on the user's history of use.

The transmitting the information may include transmitting the information related to the use history of the user which corresponds to the content being currently displayed.

The information related to the use history of the user may include information relating to the at least one content which is relevant to the content currently displayed on the display apparatus.

The information related to the use history of the user may include information related to the currently displayed content and information related to a viewing propensity of the user, who is concerned with the at least one relevant content.

The method may further include displaying an image related to the relevant content selected in accordance with the command of the user received through the remote controller from among the at least one relevant content.

According to another aspect of an exemplary embodiment, a remote controller for controlling a display apparatus includes: a command receiver configured to receive a user command; a display configured to display information; a communicator configured to communicate with the display apparatus; and a controller configured to transmit the user command to the display apparatus in order to display an image of a predetermined content, receives information related to a history of use where the user has used the content, and controls the display to display the information related to the content based on the received information related to the use history of the user.

The controller may be configured to control the communicator in order to receive the information from the display apparatus related to the use history of the user, which corresponds to the content being currently displayed on the display apparatus.

The information related to the use history of the user may include information related to at least one content relevant to a currently displayed content.

The information related to the use history of the user may include information related to the currently displayed content and information related to a viewing propensity of the user who is concerned with the at least one relevant content.

The information related to the contents may include a graphic user interface (GUI) item of the currently displayed content, and a GUI item of the at least one relevant content, and the controller may perform control to display the GUI item of the currently displayed content and the GUI item of the at least one relevant content to be adjacent to each other in accordance with the viewing propensity of the user.

The controller may be configured to perform a control operation in order to display a link line showing a correlation between the currently displayed content and the at least one relevant content based on the viewing propensity of the user.

The controller may be configured to perform a control operation in order to display the GUI item of the at least one relevant content to have various sizes depending on the viewing propensity of the user.

The controller may transmit the command of the user for selecting one relevant contents one among the plurality of relevant contents to the display apparatus so that an image of the selected relevant content can be displayed on the display apparatus.

According to another aspect of an exemplary embodiment, a method of controlling a remote controller to control a display apparatus is provided, the method including: receiving a user command; transmitting the received command of the user to the display apparatus so that an image of a predetermined content can be displayed on the display apparatus; receiving information related to a use history that the user has used the content from the display apparatus; and displaying the information related to the content based on the received use history of the user.

The receiving the information from the display apparatus related to the use history of the user may include receiving the information related to the use history of the user, which corresponds to a content being currently displayed on the display apparatus.

The information related to the use history of the user may include information related to at least one content which is relevant to a currently displayed content.

The information related to the use history of the user may include information related to the currently displayed content and information related to a viewing propensity of the user concerned with the at least one relevant content.

The information related to the contents may include a graphic user interface (GUI) item of the currently displayed content, and a GUI item of the at least one relevant content, and the displaying may include displaying the GUI item of the currently displayed content and the GUI item of the at least one relevant content to be adjacent to each other, in accordance with the viewing propensity of the user.

The displaying may include displaying a link line showing a correlation between the currently displayed content and the at least one relevant content based on the viewing propensity of the user.

The displaying may include displaying the at least one relevant content to have various sizes, depending on the viewing propensity of the user.

The method may further include: transmitting the command of the user for selecting one among the plurality of relevant contents to the display apparatus so that an image of the selected relevant content can be displayed on the display apparatus.

An aspect of an exemplary embodiment may provide a remote controller for controlling a display apparatus, the remote controller including: a display configured to display information; a controller configured to transmit a user command to the display apparatus in order to display an image of predetermined content, receive information from the display apparatus related to a use history of the user using the content, and control the display in order to display the information related to the content, wherein the information related to the use history of the user comprises information related to at least one content relevant to the content which is currently displayed on the display apparatus.

The remote controller may further include a communicator configured to communicate with the display apparatus, wherein the controller is configured to control the communicator in order to receive from the display apparatus the information related to the use history of the user, which corresponds to the content being currently displayed on the display apparatus.

The information related to the use history of the user may include information related to the at least one content which is relevant to a currently displayed content.

In addition, the information related to the use history of the user may include information related to the currently displayed content and information related to a viewing propensity of the user.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
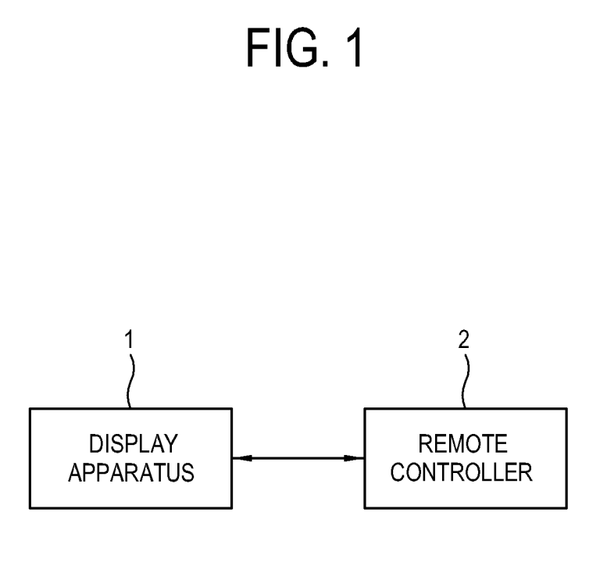
FIG. 1 is a block diagram showing a display apparatus and a remote controller according to an exemplary embodiment.

Below, exemplary embodiments will be described in detail. FIG. 1 is a block diagram showing a display apparatus and a remote controller according to an exemplary embodiment. The display apparatus 1 may be implemented as a television (TV). The remote controller 2 is a device for remotely controlling the display apparatus 1. As shown in FIG. 1, the display apparatus 1 and the remote controller 2 are connected to communicate with each other. The communication between the display apparatus 1 and the remote controller 2 may include a short range wireless network such as Bluetooth®, Wi-Fi, etc. That is, the display apparatus 1 and the remote controller 2 are adjacent to each other, and thus a user can use both the display apparatus 1 and the remote controller 2 within substantially one space. The display apparatus 1 and the remote controller 2 are individual devices separated from each other, but the display apparatus according to an exemplary embodiment may incorporate the remote controller 2 therein. That is, the display apparatus may be manufactured in the form of one system where a main body of the display apparatus (corresponding to the display apparatus 1 of FIG. 1) and the remote controller 2 are all involved.

The display apparatus 1 may offer contents received through a video signal such as a TV signal. There is no limit to the kinds of contents offered by the display apparatus 1, and for example, the contents may be related to music, a movie, a picture, a game, a social network service (SNS), news, health, learning, etc. A user uses the remote controller 2 to request that the display apparatus 1 offer contents, and for controlling the display apparatus 1 offering the contents. For example, a user selects a channel through the remote controller 2, and the display apparatus 1 displays the contents of the channel selected through the remote controller 2.

The remote controller 2 offers appended information related to the content (hereinafter, referred to as information related to the content. For example, the remote controller 2 may offer information related to the content being currently displayed on the display apparatus 1. The remote controller 2 may visually display the information related to the content. Also, the remote controller 2 may provide an interface, for example, a graphic user interface (GUI) for receiving a user's input so that s/he can easily use information related to a desired content. The remote controller 2 may provide a touch type interface so that a user can effectively use information related to the contents through the GUI. Through the GUI offered by the remote controller 2, a user uses the information related to the content being displayed on the display apparatus 1 and requests different contents. The display apparatus 1 may offer the information related to the currently displayed content to the remote controller 2, and may offer different contents requested through the remote controller 2.

Thus, in the display apparatus 1 and the remote controller 2, according to an exemplary embodiment, the information related to the content is not offered through the display apparatus 1 which currently displays the content but the remote controller 2, and therefore a user's view of the content is not interfered with, thereby improving the convenience of the user.

The remote controller 2 provides information related to a content based on a use history that a user has used the content. The use history that a user has used the content may for example include when, how long and how often she or he views this content, the objective facts that have occurred while using the corresponding content, and a user's taste or propensity of the corresponding content. The display apparatus 1 checks it whenever a user uses a certain content and stores relevant information as the use history which reflects that a user has used the corresponding content. The display apparatus may send information to the remote controller 2 which relates to the use history of the user, and the remote controller 2 provides the information related to the content based on the received information regarding the use history of the user.

Accordingly, in the display apparatus 1 and the remote controller 2 according to an exemplary embodiment, the information related to the content is offered based on the use history of the user who has used the content. Thus, the information related to the content matching with the use history is automatically available even though she or he does not separately input data related to her/his desired information, thereby providing highly reliable information and improved convenience to the user.

Figure 2:
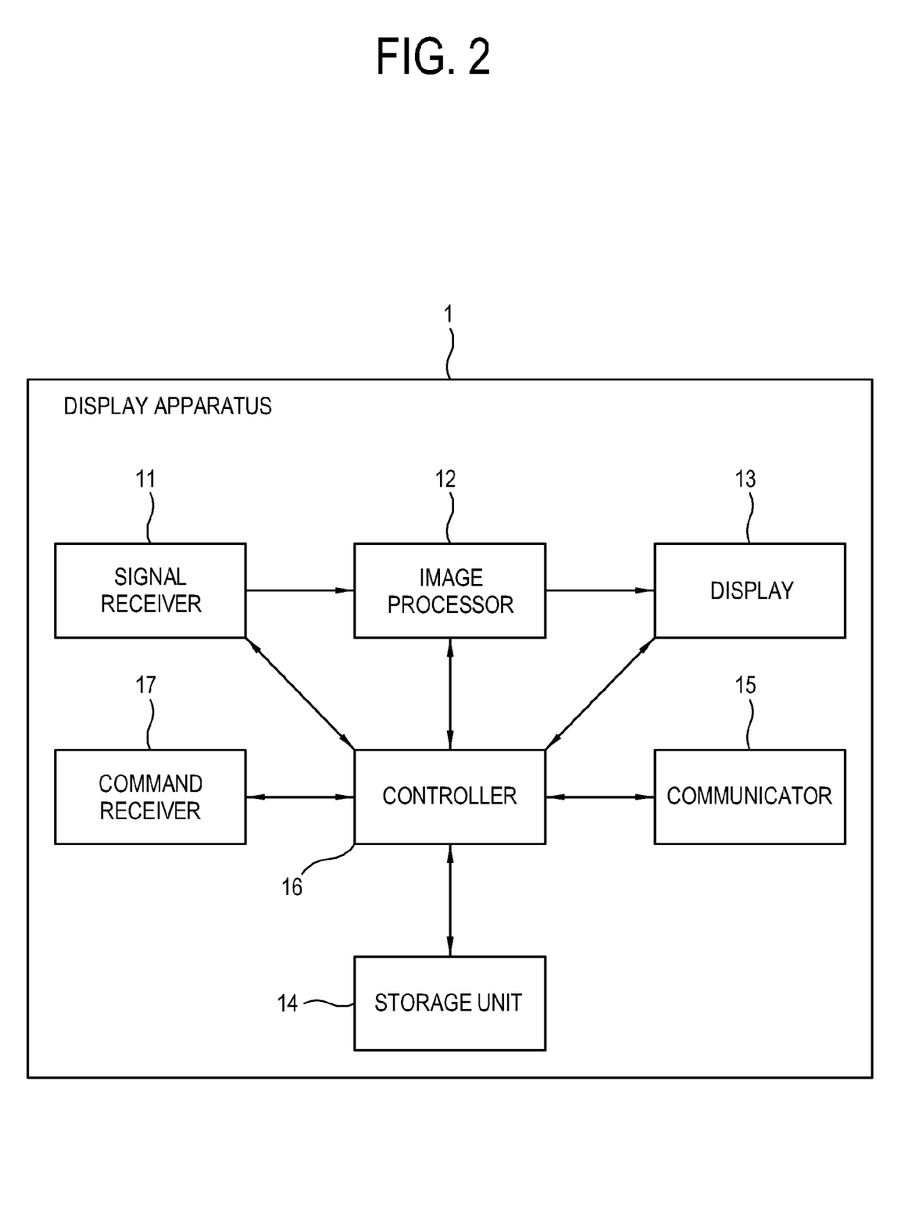
FIG. 2 is a block diagram showing elements of the display apparatus according to an exemplary embodiment.

FIG. 2 is a block diagram showing elements of the display apparatus according to an exemplary embodiment. The display apparatus 1 may include a signal receiver 11, an image processor 12, a display 13, a storage 14, a communicator 15 and a controller 16. The signal receiver 11 receives a video signal. The video signal may, for example, include a broadcasting signal. The broadcast signal may be broadcasted by skywave broadcast, a cable broadcast, satellite broadcast, etc. The broadcast signal corresponds to a plurality of channels. The signal receiver 11 receives a broadcast signal of one channel selected by a user from among the plurality of channels. The signal processor 12 processes the broadcast signal received in the signal receiver 11, to be displayed as an image on the display 13. Alternatively, the video signal may, for example, be received from a digital versatile disc (DVD) player, a Blu-Ray Disc™ (BD) player or the like video device; from a personal computer (PC); from a network such as Internet; from a network such as Bluetooth® or Wi-Fi; and from a memory such as a universal serial bus (USB) storage medium.

The image processor 12 processes the received video signal to be displayed as an image on the display 13. The image processor 12 may apply image processing such as modulation, demodulation, multiplexing, demultiplexing, analog-digital conversion, digital-analog conversion, decoding, encoding, image enhancement, etc. to the received video signal.

The display 13 displays an image based on the video signal processed by the image processor 12. The display 13 may display an image through various methods such as liquid crystal display (LCD), a plasma display panel (PDP), an organic light emitting diode (OLED), etc.

The storage 14 is a nonvolatile memory such as a flash memory, a hard disk drive, etc., and stores a user's history information related to the content.

The communicator 15 performs communication with the remote controller 2. There is no limit to a method of communication between the communicator 15 and the remote controller 2, and for example a short range wireless communication method such as Bluetooth®, Wi-Fi, etc., may be employed.

The controller 16 performs general control for the display apparatus 1. The controller 16 may include a control program, a nonvolatile memory such as a flash memory for storing the control program, a volatile memory such as a random access memory (RAM) for loading at least a part of the control program, and a microprocessor for executing the loaded control program.

Figure 3:
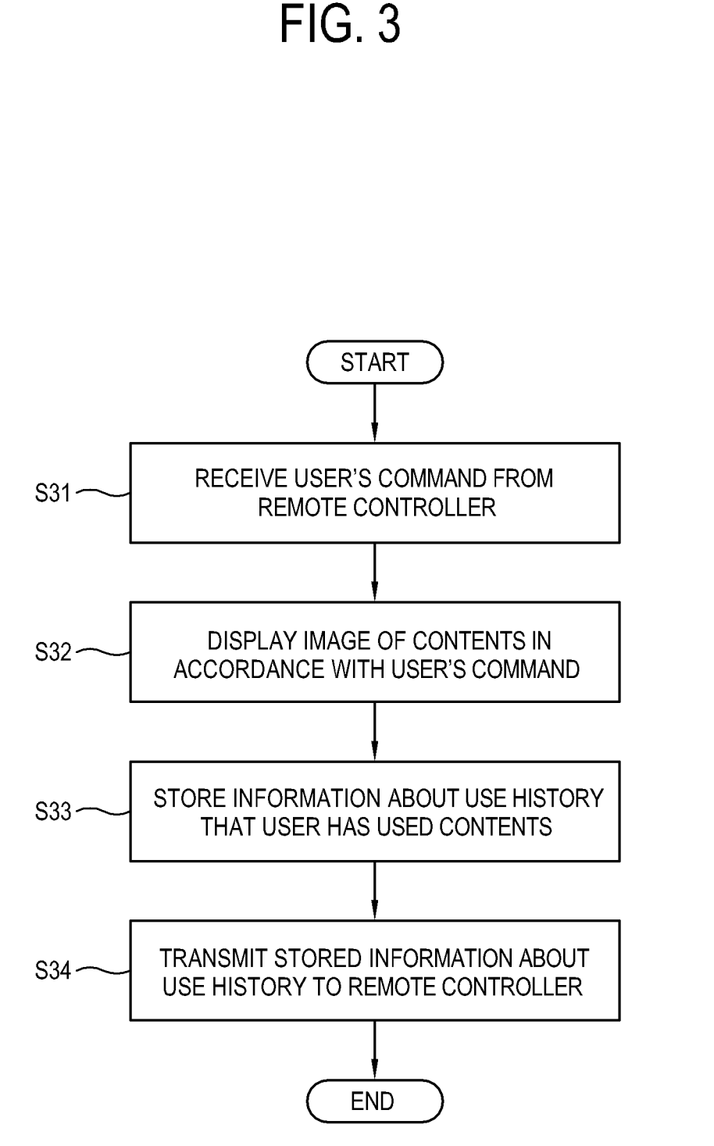
FIG. 3 is a flowchart showing operations of the display apparatus according to an exemplary embodiment.

FIG. 3 is a flowchart showing operations of the display apparatus under control of the controller 16. First, at operation S31, the display apparatus 1 receives a user command from the remote controller 2. Second, at operation S32, the display apparatus 1 displays an image of the content in accordance with the user command received from the remote controller 2. Meanwhile, at operation S33, the display apparatus 1 stores information related to the use history related to the user having used the content. At operation S34, the display apparatus 1 transmits to the remote controller 2 the stored information related to the use history of the user.

Referring back to FIG. 2, the display apparatus 1 may further include a command receiver 17 to receive a user command. The command receiver 17 may include, for example, a control panel with a plurality of buttons to receive a user's command. Alternatively, the command receiver 17 may further include a motion sensor for sensing a user's motion as a user's command. Although it is not shown, the display apparatus 1 may further include a power supply to supply operational power to the display apparatus 1.

Figure 4:
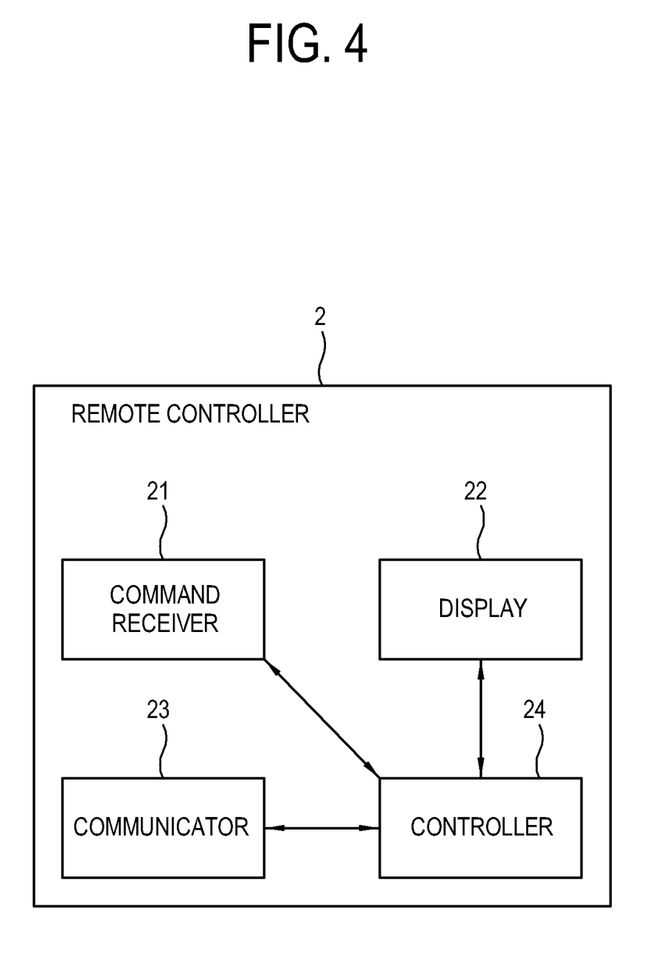
FIG. 4 is a block diagram showing elements of the remote controller according to an exemplary embodiment.

FIG. 4 is a block diagram which shows elements of the remote controller 2, according to an exemplary embodiment. The remote controller 2 may include a command receiver 21, a display 22, a communicator 23, and a controller 24. The command receiver 21 receives a user's command to control the display apparatus 1. The command receiver 21 may be achieved in various forms, and may for example include a plurality of buttons for character input, a touch pad or touch screen for touch input, or a motion sensor for sensing motion. In response to the command receiver 21 being achieved by a touch screen, a configuration for the touch input may be provided in the display 22 or may be overlapped with the display 22.

The display 22 displays information related to a content. The display 22 may be achieved, for example, by the LCD or OLED provided in a certain region of the remote controller 2. The communicator 23 communicates with the communicator 15 of the display apparatus 1. The communicator includes a communication interface for performing communication by the same method as that of the communicator 15 of the display apparatus 1.

The controller 24 performs general control for the remote controller 2. The controller 24 may include a control program, a nonvolatile memory such as a flash memory for storing the control program, a volatile memory such as a random access memory (RAM) for loading at least a part of the control program, and a microprocessor for executing the loaded control program.

Figure 5:
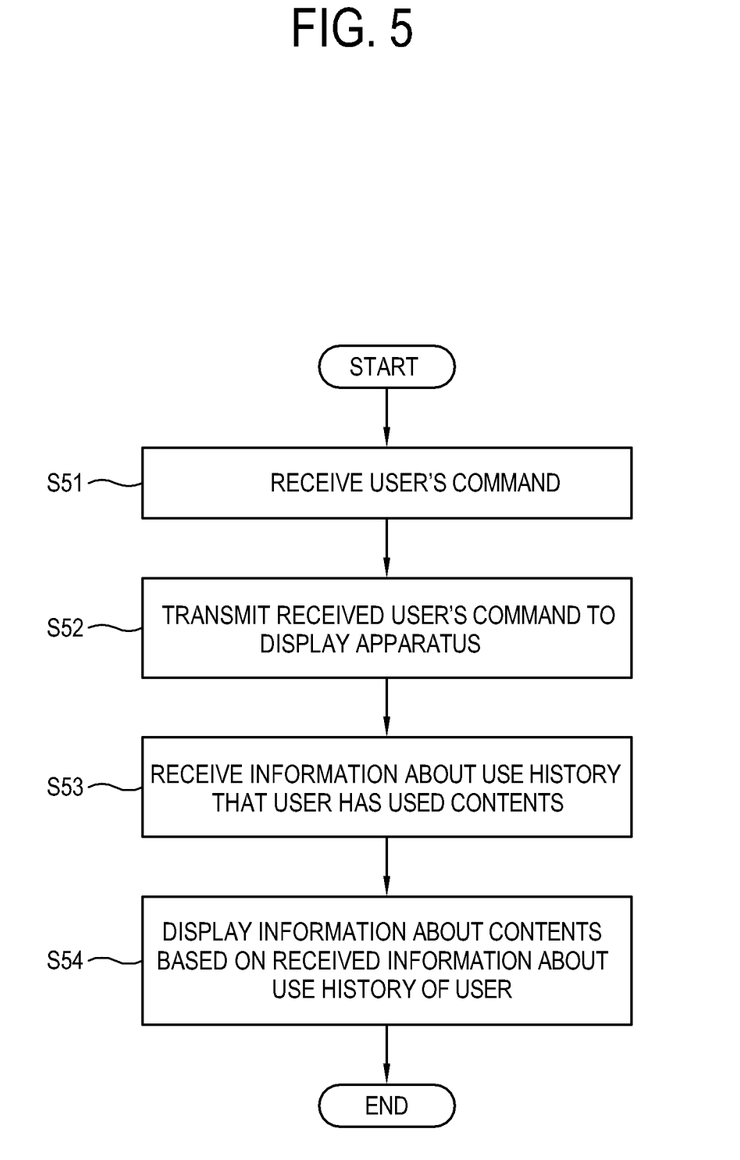
FIG. 5 is a flowchart showing operations of the remote controller according to an exemplary embodiment.

FIG. 5 is a flowchart showing operations of the remote controller 2 under control of the controller 24. First, at operation S51, the remote controller 2 receives a user command of a user to control the display apparatus 1. At operation S52, the remote controller 2 transmits the received user command to the display apparatus 1. At operation S53, the remote controller 2 receives from the display apparatus 1 information related to the use history that the user has used the content. At operation S54, the remote controller 2 displays the information related to the content based on the received information related to the use history that the user has used the contents from the display apparatus 1.

Figure 6:
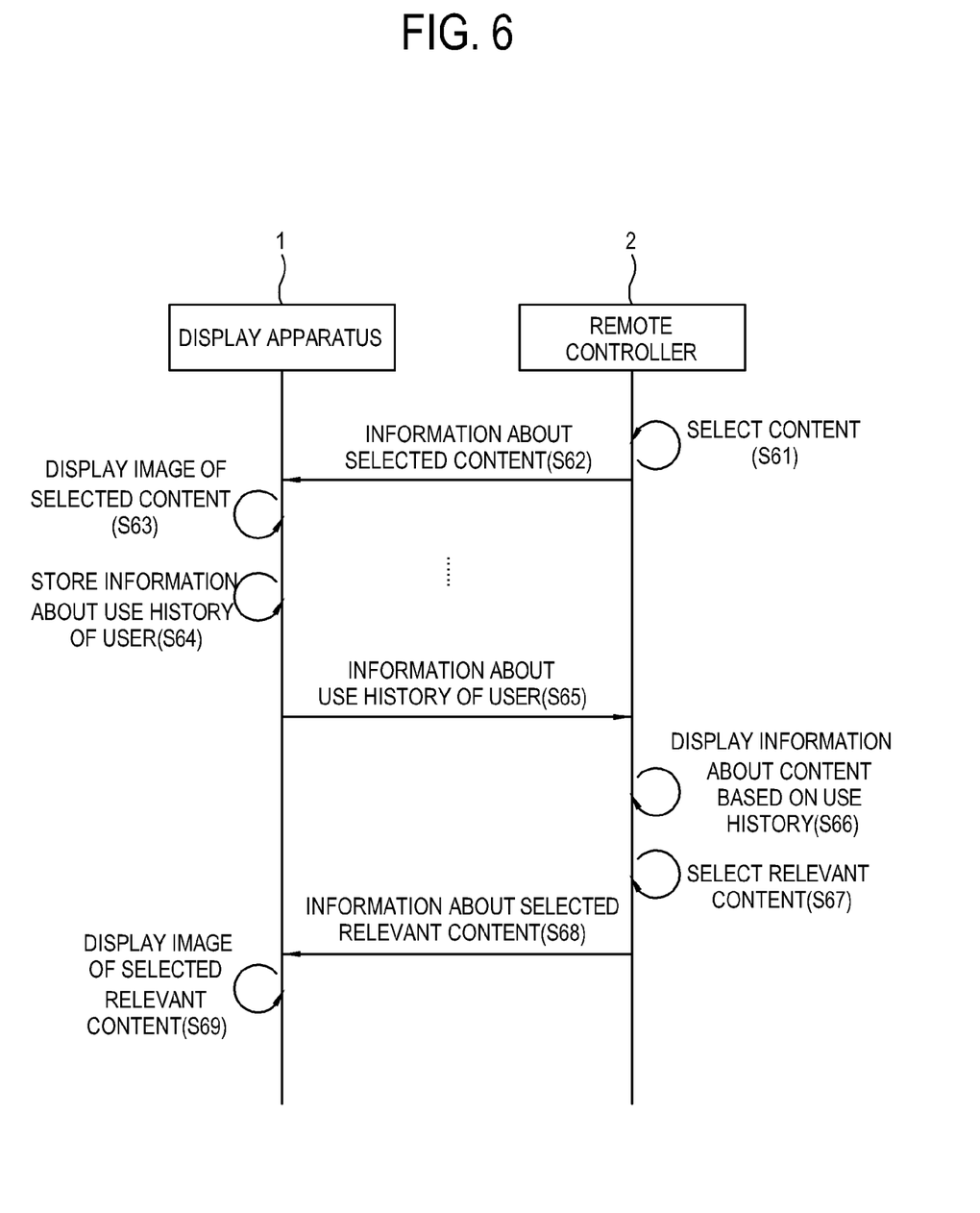
FIG. 6 shows more detailed operations between the display apparatus and the remote controller, according to an exemplary embodiment.
Figure 7:
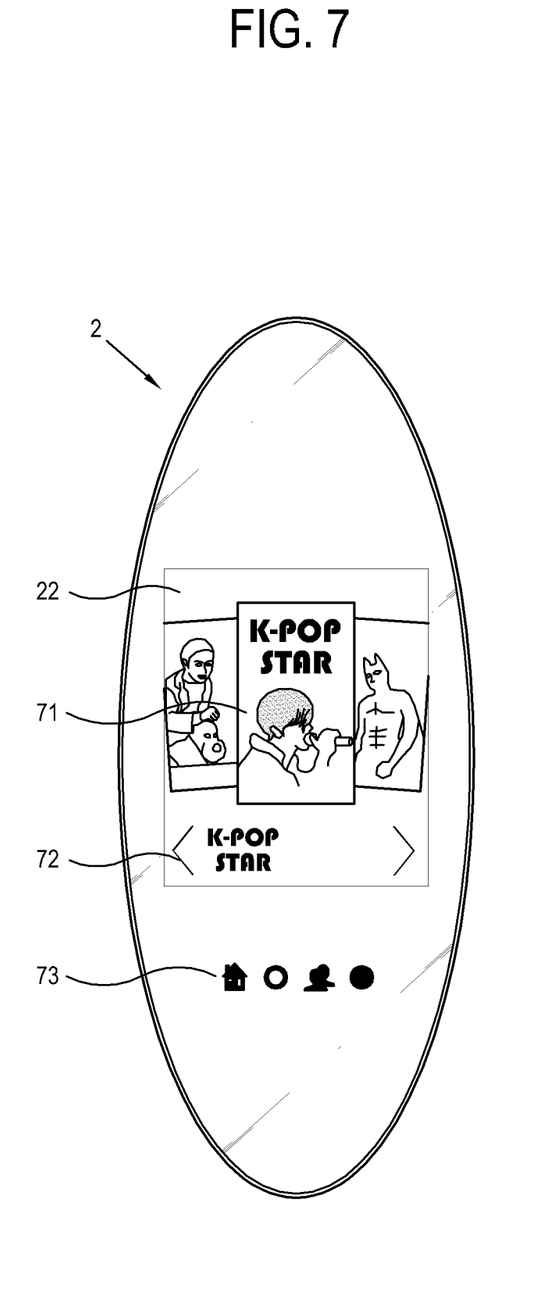
FIG. 7 shows an example of information related to contents, displayed in the remote controller, according to an exemplary embodiment.

FIG. 6 shows more detailed operations between the display apparatus 1 and the remote controller. First, at operation S61, the remote controller 2 selects a content in accordance with a command of a user. The remote controller 2 may provide information related to the content so that the user can easily select his/her desired content. FIG. 7 shows an example of information related to contents, displayed in the remote controller 2 according to an exemplary embodiment. As shown in FIG. 7, the remote controller 2 may display information 71 on display 22 that is related to the content. The information 71 related to the content includes one or more information related to the content that can be offered by the display apparatus 1. The remote controller 2 may receive from the display apparatus 1 the information 71 related to the content. The remote controller 2 may request that the display apparatus 1 send the information 71 related to the content. The remote controller 2 may request the display apparatus 1 to send the information 71 related to the content in response to a user issuing a command. The remote controller 2 may request that the display apparatus 1 send the information 71, related to a certain content in accordance with a user's command. The display apparatus 1 may transmit the information 71 related to the requested content to the remote controller 2 in response to receiving from the remote controller 2 the request for the information 71 related to the content. Alternatively, the display apparatus 1 may periodically transmit the information 71 related to the content to the remote controller 2.

The information 71 related to the content displayed in the remote controller 2 may include an image, a text, etc., which represents the content. The information 71 related to the content includes information related to a plurality of contents. In response to their being many contents to be displayed on the remote controller 2, the contents to be displayed may be grouped into parts and then displayed part by part. The remote controller 2 may display the information 71 related to the plurality of contents to be navigated by control of a user. Further, the remote controller 2 may allow a user to search the information 71 related to a certain content. To this end, the remote controller 2 may include a navigation/search button 72 for navigating or searching the information 71 related to the plurality of contents. For example, the navigation/search button 72 may be achieved by a GUI displayed on the display 22 of the remote controller 2. Thus, a user may view desired information while navigating or searching the information 71 related to the plurality of contents through the navigation/search button 72. Alternatively, the remote controller 2 may allow the information 71 which is related to the plurality of contents to be navigated or searched in accordance with a user touch input on the display through the touch-screen type command receiver 21.

The remote controller 2 may allow a user to select one information from among the information 71 about the plurality of contents. For example, the remote controller 2 may further include a selection button, and determines that one information from among the information 71 related to the plurality of contents is selected by a user through the selection button 73. Alternatively, the remote controller 2 may determine that one information from among the information 71 related to the plurality of contents is selected by a user in accordance with a touch input by a user on the display 22 through the touch-screen type command receiver 21.

Referring back to FIG. 6, at operation S62, the remote controller 2 transmits to the display apparatus 1 information related to the content selected in accordance with a user command. At operation S63, the display apparatus 1 displays an image which corresponds to content based on the information received from the remote controller which is related to the selected content from the remote controller 2. At operation S64, the display apparatus 1 stores information related to the use history of the user with regard to the corresponding content. The display apparatus 1 continuously monitors which contents a user uses and how the user uses the contents. For example, like the operations S62 and S63, in response to a user requesting an offering or search result of a certain content through the remote controller 2, relevant information related to the corresponding content is stored as his/her history information. Specifically, the display apparatus 1 stores information which includes a title, a requested date, a use time (viewing hours or the like), etc., of the corresponding content as a user's history information.

The display apparatus 1 may individually manage the history information of a plurality of users according to the users use history. The operations S61 to S64 may iterate. The display apparatus 1 may store a user's history information while a user uses various contents during the iteration of the operations S61 to S64.

Meanwhile, at operation S65, the display apparatus 1 may transmit the stored information related to the use history of the user to the remote controller 2. The display apparatus 1 may send the remote controller 2 the information related to the use history of the user with regard to the currently displayed content. Alternatively, in response to a certain event occurring, the display apparatus 1 may send the remote controller 2 the information related to the use history of the user with regard to a voluntary content or the content relevant to the corresponding event. Alternatively, the display apparatus 1 may periodically send the remote controller 2 the information related to the use history of the user with regard to a voluntary content or a content designated by the user. The display apparatus 1 processes the stored information related to the use history of the user in order to reflect the information related to the viewing propensity of the user with respect to the corresponding content, and transmits the processed information related to the use history of the user to the remote controller 2. Alternatively, the information related to the use history of the user may be processed in the remote controller 2. Alternatively, the information related to the use history of the user may be processed in a separate device. For example, at least one device between the display apparatus 1 and the remote controller 2 may communicate with a server (not shown) connectable through a network, and thus acquires information related to the use history of the user from the server or updates information related to the use history of the user through the server. In this case, the display apparatus 1 may receive the information related to the use history of the user from the server and transmits it to the remote controller 2, or the remote controller 2 may directly receive from the server the information related to the use history of the user.

Figure 8:
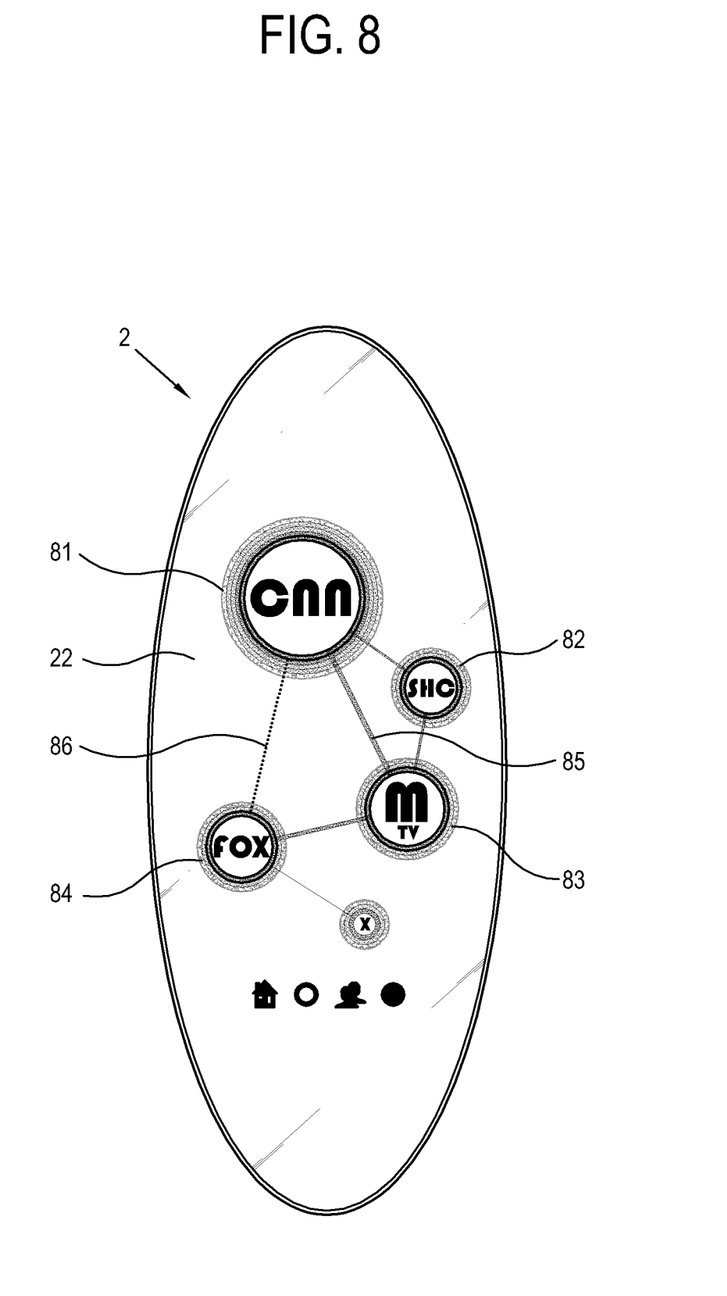
FIG. 8 shows an example of information related to contents based on a use history of a user, displayed in the remote controller, according to an exemplary embodiment.

At operation S66, the remote controller 2 displays the information related to the content, based on the information related to the use history of the user received from the display apparatus 1. FIG. 8 shows an example of information related to contents based on a use history of a user, displayed in the remote controller 2 according to an exemplary embodiment. As shown in FIG. 8, the remote controller 2 may display on the display 22 information 81 to 86 related to the content based on the use history of the user. For example, the information 81 to 86 related to the content based on the use history of the user may include the information related to the content which is relevant to the content being currently displayed on the display apparatus 1. Specifically, as shown in FIG. 8, the remote controller 2 may display an item 81 of the content being currently displayed on the display apparatus 1 and items 82 to 84 of contents relevant to the currently displayed content in the form of a GUI. The item 81 of the currently displayed content and the respective items 82 to 84 of the relevant contents may represent the viewing propensity of the user. For example, the remote controller 2 may display the item 81 of the currently displayed content and the items 82 to 84 of the relevant content to be adjacent to each other in accordance with the viewing propensity of the user. That is, the remote controller may display the item 82 of the most frequently selected content to be more adjacent to the item 81 of the currently displayed content than the items 83 and 84 of the other contents, based on the viewing propensity of the user, in response to a user changing the contents while viewing the currently displayed content 81.

Also, the remote controller 2 may display link lines, which show a correlation between the currently displayed content 81 and the plurality of relevant contents 82 to 84, to additionally be displayed between the respective items 81 to 84. For example, the line links 85 and 86 may be represented by straight lines connecting the respective items 81 to 84. The line links 85 and 86 may be represented in various forms according to the correlation between the currently displayed content 81 and the plurality of relevant contents 82 to 84. For example, in response to the correlation among the currently displayed content 81, the first relevant content 82 and the second relevant content 83 being relatively high, the line link 85 is represented by a solid line. On the other hand, in response to the correlation between the currently displayed content 81 and the third relevant content 84 being relatively low, the line link 85 may be represented by a dotted line. Alternatively, the line link 85 and 86 may be varied in thickness depending on the correlation between the content 81 and the plurality of relevant contents 82 to 84.

The remote controller 2 may display the respective GUI items 82 to 84 of the plurality of relevant contents to have various sizes, depending on the viewing propensity of the user. For example, among the plurality of relevant contents, the item 83 of the relevant content relatively frequently viewed by a user may be displayed to have a large size, but the item 82 of the relevant content relatively infrequently viewed by a user may be displayed to have a small size.

According to another exemplary embodiment, the remote controller 2 may display certain relevant contents 82 to 84 which correspond to the same category (e.g., news) as that of the currently displayed content in response to a user dragging an edge of the item 81 of the corresponding content in a first direction (e.g., a clockwise direction), and display general relevant contents 82 to 84 which correspond to all categories in response to a user dragging it in a second direction (e.g., a counterclockwise direction). However, this exemplary embodiment is nothing but an example, Alternatively, it will be appreciated that the information related to the contents which correspond to various correlations can be offered in accordance with a user's inputs in the first direction, the second direction, etc.

Referring back to FIG. 6, at operation S67, the remote controller 2 selects one content from among the plurality of relevant contents 82 to 84. That is, a user may select one desired to be used among the plurality of relevant contents 82 to 84. The remote controller 2 offers the respective items 82 to 84 of the relevant contents to be selected by a user. For example, the remote controller 2 may determine that the one content from among the plurality of relevant contents 82 to 84 is selected in accordance with a user's touch input on the display 22.

For example, the currently displayed content 81 and the plurality of relevant contents 82 to 84 may be channels for the broadcast signal that offers the corresponding contents. According to an exemplary embodiment, referring to FIG. 8, in response to a user touching one item of the currently displayed content 81 or the plurality of relevant contents 82 to 84 and dragging the item in a predetermined direction (for example, up and down directions), the remote controller 2 may display an additional menu (not shown) related to the relevant content at the edge of the corresponding items 81 to 84. The additional menu may, for example, show a list of previous or next channels with respect to the channel of the touched content 81 to 84 so that the previous or next channels can be selected. Through the additional menu, a user can more easily search the neighboring channels of the touched content 81 to 84 and may select a desired channel.

Referring back to FIG. 6, at operation S68, the remote controller 2 transmits information related to the one content selected by a user from among the plurality of relevant contents 82 to 84 to the display apparatus 1. Next, at operation S69, the display apparatus 1 displays an image of the relevant content 82, 83 or 84 selected by a user based on the information received from the remote controller 2. Thus, a user can easily select a desired channel through the items 82 to 84 of the plurality of relevant contents displayed on the remote controller 2.

Thus, in the display apparatus 1 and the remote controller 2 according to an exemplary embodiment, a user can more easily grasp his/her own viewing propensity, and more conveniently search and use the content through the user's viewing propensity. Also, a user may be more interested in using the content obtained through a process of recommending the relevant contents based on his/her own viewing propensity, from among the contents that she or he has used.

As described above, information related to contents is more effectively available with minimum interference to a user's viewing of contents.

Also, information related to contents can be more conveniently used in accordance with a user's propensity of using contents.

Further, a user is allowed to more intuitively use information related to contents.

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modification and equivalents may fall within the scope of the invention.

What is claimed is:

1. A remote controller for controlling a display apparatus operable to display an image of a first content, the remote controller comprising:
   a command receiver configured to receive a user command;
   a display configured to display an image;
   a communicator configured to communicate with the display apparatus; and
   a controller configured to control the communicator to transmit the user command to the display apparatus in order to display the image of the first content, and control the display to display a graphic user interface (GUI) which comprises:
      a first item corresponding to the first content of which the image is being displayed on the display apparatus; and
      a plurality of second items corresponding to a plurality of second contents which are related to the first content,
   wherein the first item and the plurality of second items are displayed to indicate correlation between the first content and each of the plurality of second contents, and
   wherein the controller is further configured to perform a control operation in order to display the GUI such that the plurality of second items have various sizes, depending on the correlation between the first content and the plurality of second contents, respectively.

2. The remote controller according to claim 1, wherein the correlation between the first content and each of the plurality of second contents is based on a viewing propensity of the user.

3. The remote controller according to claim 1, wherein the controller is further configured to perform a control operation in order to display the GUI such that the higher the correlation of one among the plurality of second contents to the first content is, the more corresponding one among the plurality of second items is adjacent to the first item than others.

4. A remote controller for controlling a display apparatus operable to display an image of a first content, the remote controller comprising:
   a command receiver configured to receive a user command;
   a display configured to display an image;
   a communicator configured to communicate with the display apparatus; and
   a controller configured to control the communicator to transmit the user command to the display apparatus in order to display the image of the first content, and control the display to display a graphic user interface (GUI) which comprises:
      a first item corresponding to the first content of which the image is being displayed on the display apparatus; and
      a plurality of second items corresponding to a plurality of second contents which are related to the first content,
   wherein the first item and the plurality of second items are displayed to indicate correlation between the first content and each of the plurality of second contents, and
   wherein the controller is further configured to perform a control operation in order to display the GUI which further comprises link lines being displayed between the first item and the plurality of second items, respectively, and showing the correlation between the first content and the plurality of second contents.

5. The remote controller according to claim 1, wherein the controller is further configured, in response to the user command of selecting one among the plurality of second items being received, to control the communicator to transmit to the display apparatus the user command which comprises information on one of the plurality of second contents corresponding to the selected one among the plurality of second items so that an image of the selected content is displayed on the display apparatus.

6. A method of controlling a remote controller to control a display apparatus operable to display an image of a first content, the method comprising:
   receiving a user command;
   transmitting the received user command to the display apparatus so that the image of the first content is displayed on the display apparatus; and
   displaying on the remote controller a graphic user interface (GUI) which comprises:
      a first item corresponding to the first content of which the image is being displayed on the display apparatus; and
      a plurality of second items corresponding to a plurality of second contents which are related to the first content,
   wherein the first item and the plurality of second items are displayed to indicate correlation between the first content and each of the plurality of second contents, and wherein the displaying comprises displaying the GUI such that the plurality of second items have various sizes, depending on the correlation between the first content and the plurality of second contents, respectively.

7. The control method according to claim 6, wherein the correlation between the first content and each of the plurality of second contents is based on a viewing propensity of the user.

8. The control method according to claim 6, wherein the displaying comprises displaying the GUI such that the higher the correlation of one among the plurality of second contents to the first content is, the more corresponding one among the plurality of second items is adjacent to the first item than others.

9. A method of controlling a remote controller to control a display apparatus operable to display an image of a first content, the method comprising:
   receiving a user command;
   transmitting the received user command to the display apparatus so that the image of the first content is displayed on the display apparatus; and
   displaying on the remote controller a graphic user interface (GUI) which comprises:
      a first item corresponding to the first content of which the image is being displayed on the display apparatus; and
      a plurality of second items corresponding to a plurality of second contents which are related to the first content,
   wherein the first item and the plurality of second items are displayed to indicate correlation between the first content and each of the plurality of second contents, and
   wherein the displaying comprises displaying the GUI which further comprises link lines being displayed between the first item and the plurality of second items, respectively, and showing the correlation between the first content and the plurality of second contents.

10. The remote controller according to claim 6, further comprising: in response to the user command of selecting one among the plurality of second items being received, transmitting to the display apparatus the user command which comprises information on one of the plurality of second contents corresponding to the selected one among the plurality of second items so that an image of the selected relevant content is displayed on the display apparatus.

11. A system comprising a display apparatus and a remote controller, wherein the display apparatus comprises:
   an image processor configured to process an image of a first content;
   a first display configured to display the processed image of the first content;
   a first communicator configured to communicate with the remote controller; and
   a first controller configured to control the first display to display the image of the first content in accordance with a user command received from the remote controller,
   wherein the remote controller comprises:
      a command receiver configured to receive the user command;
      a second display configured to display an image;
      a second communicator configured to communicate with the first communicator; and
      a second controller configured to control the second communicator to transmit the user command to the display apparatus, and controls the second display to display a graphic user interface (GUI) which comprises:
         a first item corresponding to the first content of which the image is being displayed on the display apparatus; and
         a plurality of second items corresponding to a plurality of second contents which are related to the first content,
      wherein the first item and the plurality of second items are displayed to indicate correlation between the first content and each of the plurality of second contents, and
      wherein the second controller is further configured to perform a control operation in order to display the GUI such that the plurality of second items have various sizes, depending on the correlation between the first content and the plurality of second contents, respectively.

12. A non-transitory computer readable medium containing a computer program for allowing a device to perform a method comprising:
   receiving at the device a user command;
   transmitting the user command from the device to a display apparatus in order for the display apparatus to display an image of a first content based on the transmitted user command; and
   displaying on the remote controller a graphic user interface (GUI) which comprises:
      a first item corresponding to the first content of which the image is being displayed on the display apparatus; and
      a plurality of second items corresponding to a plurality of second contents which are related to the first content,
   wherein the first item and the plurality of second items are displayed to indicate correlation between the first content and each of the plurality of second contents, and
   wherein the displaying comprises displaying the GUI such that the plurality of second items have various sizes, depending on the correlation between the first content and the plurality of second contents, respectively.

13. The remote controller according to claim 4, wherein the controller is further configured to perform a control operation in order to display the GUI such that at least one of a form and thickness of the link lines corresponds to the correlation between the first content and each of the plurality of second contents.

14. The remote controller according to claim 1, wherein the controller is further configured, in response to the user command of a gesture being received on the first item, to perform a control operation in order to display the GUI which comprises at least one among the plurality of second items of the plurality of second contents having a category corresponding to a direction of the gesture.

15. The control method according to claim 9, wherein the displaying comprises displaying the GUI such that at least one of a form and thickness of the link lines corresponds to the correlation between the first content and each of the plurality of second contents.

16. The control method according to claim 6, wherein the displaying comprises, in response to the user command of a gesture being received on the first item, displaying the GUI which comprises at least one among the plurality of second items of the plurality of second contents having a category corresponding to a direction of the gesture.

17. The system according to claim 11, wherein the correlation between the first content and each of the plurality of second contents is based on a viewing propensity of the user.

18. The system according to claim 11, wherein the second controller is further configured to perform a control operation in order to display the GUI such that the higher the correlation of one among the plurality of second contents to the first content is, the more corresponding one among the plurality of second items is adjacent to the first item than others.

19. A system comprising a display apparatus and a remote controller, wherein the display apparatus comprises:
- an image processor configured to process an image of a first content;
- a first display configured to display the processed image of the first content;
- a first communicator configured to communicate with the remote controller; and
- a first controller configured to control the first display to display the image of the first content in accordance with a user command received from the remote controller, wherein the remote controller comprises:
- a command receiver configured to receive the user command;
- a second display configured to display an image;
- a second communicator configured to communicate with the first communicator; and
- a second controller configured to control the second communicator to transmit the user command to the display apparatus, and controls the second display to display a graphic user interface (GUI) which comprises:
  - a first item corresponding to the first content of which the image is being displayed on the display apparatus; and
  - a plurality of second items corresponding to a plurality of second contents which are related to the first content, wherein the first item and the plurality of second items are displayed to indicate correlation between the first content and each of the plurality of second contents, and wherein the second controller is further configured to perform a control operation in order to display the GUI which further comprises link lines being displayed between the first item and the plurality of second items, respectively, and showing the correlation between the first content and the plurality of second contents.

20. The system according to claim 19, wherein the second controller is further configured to perform a control operation in order to display the GUI such that at least one of a form and thickness of the link lines corresponds to the correlation between the first content and each of the plurality of second contents.

21. The system according to claim 11, wherein the second controller is further configured, in response to the user command of a gesture being received on the first item, to perform a control operation in order to display the GUI which comprises at least one among the plurality of second items of the plurality of second contents having a category corresponding to a direction of the gesture.

22. The system according to claim 11, wherein the second controller is further configured, in response to the user command of selecting one among the plurality of second items being received, to control the communicator to transmit to the display apparatus the user command which comprises information on one of the plurality of second contents corresponding to the selected one among the plurality of second items so that an image of the selected content is displayed on the display apparatus.

* * * * *